United States Patent [19]
Fukushi

[11] Patent Number: 5,815,541
[45] Date of Patent: Sep. 29, 1998

[54] DIGITAL PHASE LOCKED LOOP ASSEMBLY

[75] Inventor: Mikio Fukushi, Tokyo, Japan

[73] Assignee: NEC Corporation, Japan

[21] Appl. No.: 762,165

[22] Filed: Dec. 9, 1996

[30] Foreign Application Priority Data

Dec. 15, 1995 [JP] Japan .................................. 7-327651

[51] Int. Cl.[6] .................................................. H03D 3/24
[52] U.S. Cl. .......................... 375/376; 375/327; 375/294; 375/215; 375/373; 329/294; 329/308
[58] Field of Search ...................... 375/200, 208, 375/376, 344, 343, 361, 328, 327, 294, 215, 373; 329/307, 308, 294

[56] References Cited

U.S. PATENT DOCUMENTS

| 5,157,694 | 10/1992 | Iwasaki ........................... 329/307 |
| 5,179,573 | 1/1993 | Paradise .......................... 375/208 |
| 5,440,267 | 8/1995 | Tsuda et al. ...................... 329/308 |
| 5,504,787 | 4/1996 | Zscheile, Jr. et al. ............ 375/208 |

FOREIGN PATENT DOCUMENTS 5-75448  3/1993  Japan .

*Primary Examiner*—Stephen Chin
*Assistant Examiner*—Shuwang Liu
*Attorney, Agent, or Firm*—Ostrolenk, Faber, Gerb & Soffen, LLP

[57] ABSTRACT

A digital PLL apparatus includes a synchronization integrating circuit, an angle calculating circuit, and a digital PLL circuit. The synchronization integrating circuit determines a symbol timing by obtaining the maximum amplitude point of a correlation level during reception of a preamble. The angle calculating circuit outputs a phase $\theta c$ by performing an angle calculation every symbol timing determined by the synchronization integrating circuit. The digital PLL circuit receives the phase $\theta c$ from the angle calculating circuit and operates a phase locked loop, thereby obtaining an output phase.

4 Claims, 5 Drawing Sheets

F I G . 3
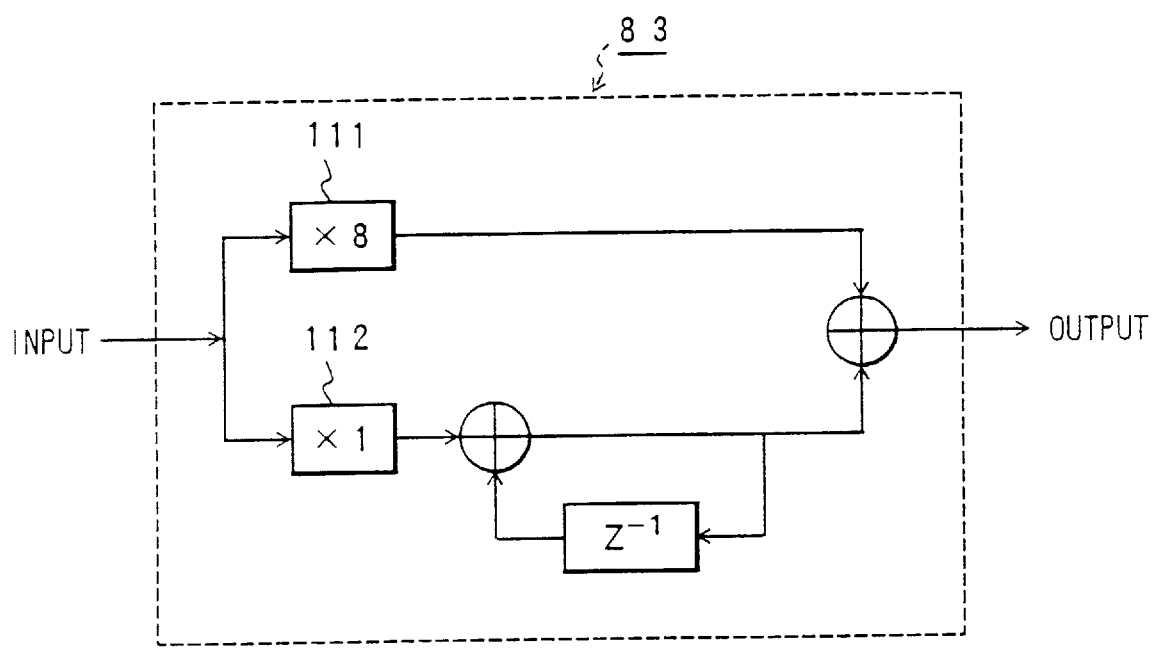

FIG. 4

OUTPUT FROM AMPLITUDE CALCULATING CIRCUIT 5

INFLUENCE OF ERROR IN QUARTZ OSCILLATOR OR MULTIPATH

SYMBOL TIMING OF SYNCHRONIZATION INTEGRATING CIRCUIT 6

| Tc | Tc Ts | Tc Ts | Tc Ts | Tc |
|---|---|---|---|---|

|← K-SYMBOL INTERVAL →| |← L-SYMBOL INTERVAL →|

OUTPUT FROM ANGLE CALCULATING CIRCUIT 7

θc    θc    θc    θc θs    θc θs
                  θs    θs

OUTPUT FORM PHASE ERROR CALCULATING CIRCUIT 85

$$\frac{\Sigma (\theta c - \theta s)}{L}$$

DIGITAL PHASE LOCKED LOOP ASSEMBLY

BACKGROUND OF THE INVENTION

1. Field of the Invention

The present invention relates to a digital phase locked loop (to be simply referred to as a digital PLL hereinafter) assembly suitably used as a demodulation processing section in a spread-spectrum communication receiver or the like using a direct spread scheme.

2. Description of the Prior Art

Many multi-directional communication systems which perform communication in a burst-like manner use PSK (Phase Shift Keying) modulation. In such a system, a carrier frequency deviation, i.e., a frequency offset, causes phase modulation distortion, affecting the error rate characteristics.

For this reason, in order to automatically compensate for a phase rotation amount based on a frequency offset, a phase locked loop type phase locking detection apparatus has been proposed. In this apparatus, for example, carrier regeneration is performed on the reception side, and the phase of the resultant wave is compared with that of an input wave, thereby causing the oscillation frequency of a phase locked oscillator to automatically follow up the input frequency. The relationship between the input signal/noise ratio and the error rate in a locking detection apparatus of this type is better than that in delay detection. However, when addition or deletion of a pulse is performed with respect to the fundamental frequency signal oscillated by the oscillator, an abrupt frequency shift or phase shift occurs.

When a digital PLL is used for the data demodulating operation of a receiver in spread-spectrum communication, the maximum value point of a correlation level is obtained from data de-spread by a correlator during reception of the preamble of burst data. A symbol timing is fixed to the maximum value point. When the digital PLL is operated every symbol timing to perform a demodulating operation, the maximum value point of correlation may shift from the symbol timing owing to precision errors of quartz oscillators in the transmitter and receiver, multipath, or the like. When the symbol timing is moved to follow up the maximum value point of the correlation level so as to improve the data demodulation precision, the phase input to the digital PLL has phase information different from that of the preceding phase. For this reason, it takes time to make the value of the NCO (Numerical Control Oscillator) of the digital PLL follow up the new phase information and to establish synchronization. Meanwhile, phase distortion occurs.

In order to prevent occurrence of an abrupt frequency shift or phase shift, for example, the digital PLL apparatus disclosed in Japanese Unexamined Patent Publication No. 5-75448 is used. This digital PLL apparatus is characterized by comprising a first reference signal generation means for outputting a signal having a frequency higher than that of an input signal, a second reference signal generation means for outputting a signal having a frequency lower than that of the input signal, and a detection means for detecting the phase difference between the output signals from the first and second reference signal generation means. In the apparatus, when the phase difference between the output signals from the first and second reference signal generation means decreases to the minimum, the phase difference with respect to the input signal is detected, and one of the output signals from the first and second reference signal generation means is selected in accordance with the detection result. FIG. 1 shows a digital PLL apparatus having the same arrangement as that of the above apparatus. Referring to FIG. 1, an oscillator 101a oscillates a signal having a frequency $f_L$, and an oscillator 101b oscillates a signal having a high frequency $f_H$. Reference numeral 102 denotes a multiplexer for selecting one of the signals having the frequencies $f_L$ and $f_H$ in accordance with a selection signal S5; 103, a frequency divider having a frequency division ratio n; 104, a phase comparison circuit for comparing the phase of an input signal S1 with an output signal S2 from the frequency divider 103; 105, a latch; and 106, a phase coincidence detection circuit for detecting a phase coincidence between the signals having the frequencies $f_L$ and $f_H$ and outputting a phase difference signal S4 to the latch 105. When the minimum phase difference between the signals having the frequencies $f_L$ and $f_H$ is detected by the phase coincidence detection circuit 106, the output signal S3 from the phase comparison circuit 104 is latched by the latch 105. Even if one of the signals having the frequencies $f_L$ and $f_H$ is selected by the multiplexer 102, and the fundamental frequency signal is switched to another signal, no abrupt frequency shift or phase shift occurs.

A conventional digital PLL apparatus must use at least two oscillators for generating fundamental frequency signals on the reception side. The manufacturing cost is therefore high.

According to the conventional scheme, since the fundamental frequency signals are switched when the phase difference between a signal output from the high-frequency oscillator and a signal output from the low-frequency oscillator decreases to the minimum, the phase error cannot be eliminated before the phase difference decreases to the minimum. In addition, it is difficult to apply this scheme to a spread-spectrum communication apparatus using a digital PLL for a demodulating operation. This is because, as described above, on the reception side of the spread-spectrum communication apparatus, the fundamental frequency signal corresponds to the symbol timing at which synchronization is established at the maximum value point of the correlation level which is searched from the data de-spread by the correlator. In general, in setting this symbol timing, correlation values which are de-spread during reception of a preamble are integrated within one symbol, and the maximum correlation point within one symbol is set as the symbol timing. When the digital PLL is operated every symbol timing to perform a demodulating operation, the maximum value point of correlation may shift from the symbol timing fixed during reception of the preamble owing to precision errors of the quartz oscillators in the transmitter and the receiver, multipath, or the like. If the symbol timing is changed to make the symbol timing follow up the maximum value point of the correlation level to improve the data demodulation precision, the phase input to the digital PLL has phase information different from that of the preceding phase. That is, in spread-spectrum communication, to make the symbol timing variable means that there is always a phase difference, and there is a possibility that phases having different pieces of phase information are input to the digital PLL before and after the symbol timing is changed owing to the influences of multipath or the like. For this reason, it takes time to make the value of the NCO of the digital PLL follow up the new phase information and to establish synchronization. Meanwhile, phase distortion occurs.

SUMMARY OF THE INVENTION

The present invention has been made in consideration of the above situation in the prior art, and has as its object to provide a digital PLL apparatus which can obtain an output phase without any phase distortion when applied as a spread-spectrum communication receiver using a direct spread scheme, and realizes high-quality data demodulation.

In order to achieve the above object, according to the first basic aspect of the present invention, there is provided a digital PLL apparatus comprising a synchronization integrating circuit for determining a symbol timing by obtaining a maximum amplitude point of a correlation level during reception of a preamble, an angle calculating circuit for outputting a phase θc by performing an angle calculation every symbol timing determined by the synchronization integrating circuit, and a digital PLL circuit for receiving the phase θc from the angle calculating circuit and operating a phase locked loop, thereby obtaining an output phase.

According to the first basic aspect, the synchronization integrating circuit may sequentially search for a maximum amplitude value point, and, when correlation maximum value points corresponding to K symbols are consecutively counted at points each corresponding to one of ±½ chips with respect to a determined symbol timing Tc, notify the angle calculating circuit of a symbol timing point Ts to which the symbol timing is to be moved, the angle calculating circuit may output a phase θs by performing an angle calculation at the symbol timing point Ts, and the digital PLL circuit may integrate, L times, the phase θc at a symbol timing at a preceding maximum peak point and the phase θs at a symbol timing point to which the symbol timing is to be moved in an L-symbol interval until the symbol timing is moved, and add an average value obtained by multiplying the integration result by 1/L to a numerical control oscillator in the digital PLL circuit when the synchronization integrating circuit shifts the symbol timing.

According to the second basic aspect of the present invention, there is provided a digital PLL apparatus wherein a signal having undergone spread-spectrum modulation is received, de-spread demodulation of the signal is performed by performing correlation calculation using a spread code for each in-phase and quadrature component, a synchronization point Tc at which a maximum correction value can be obtained is obtained by the de-spread demodulation, a synchronization point at which a maximum correlation value is obtained is sequentially searched for, a synchronization point Ts to which the synchronization point is to be moved from the synchronization point Tc is set when correlation maximum points are consecutively counted in a K-symbol interval within a range of 35 ½ chips with respect to a correlation value at the synchronization point Tc, angle information θs is obtained at the synchronization point Ts, an arithmetic means of differences (θc–θs) between angle information obtained at the synchronization point Tc and the angle information θs is obtained in an L-symbol interval until switching from the synchronization point Ts to the synchronization point Tc is performed, thereby obtaining phase error information.

According to the second basic aspect, when the synchronization point is switched from the synchronization point Tc to the synchronization point Ts, angle information obtained at the synchronization point Ts may be input to a digital PLL circuit, and the obtained phase error information may be added to a phase locked loop circuit of the digital PLL circuit.

According to the present invention, when the symbol timing is changed, even if the phase information input to the digital PLL changes before/after the movement of the symbol timing, synchronization for an NCO value can be instantaneously established without causing any frequency or phase shift. Therefore, an output phase can be obtained from the digital PLL without any phase distortion, realizing high-quality data demodulation.

In the present invention, in order to improve the data demodulation precision, when the synchronization integrating circuit determines that the amplitude level at a symbol timing other than the symbol timing determined during reception of a preamble is higher than the input phase amplitude level at the determined symbol timing with the lapse of time, the circuit moves the symbol timing in one of the directions of ±½ chips while performing synchronization control for the symbol timing.

Since the phase information of the input phase at the point at which symbol timing correction is performed is different from the preceding input phase information, the digital PLL circuit adds the arithmetic mean of the differences between the preceding phase information and the phase information at the new symbol timings to the value of the NCO (Numerical Control Oscillator) of the digital PLL. With this operation, even if a phase having new phase information is input, an output phase from the digital PLL can be instantaneously synchronized.

As is apparent from the above description, the digital PLL apparatus of the present invention includes a synchronization integrating circuit for determining a symbol timing by obtaining a maximum amplitude point of a correlation level during reception of a preamble, an angle calculating circuit for outputting a phase θc by performing an angle calculation every symbol timing determined by the synchronization integrating circuit, and a digital PLL circuit for receiving the phase θc from the angle calculating circuit and operating a phase locked loop, thereby obtaining an output phase. With this arrangement, no phase distortion occurs in the output phase from the digital PLL circuit. Therefore, high-quality data demodulation can be realized in performing a demodulating operation using the digital PLL circuit on the reception side in spread-spectrum communication. More specifically, the phase error between the preceding phase information before the movement of the symbol timing and the phase information at a new symbol timing is obtained. The obtained phase error is added to the NCO (Numerical Control Oscillator) of the digital PLL circuit at the same time when the phase information at the new symbol timing is input to the digital PLL circuit, thereby preventing phase distortion in the output phase.

The above and many other advantages, features and additional objects of the present invention will become manifest to those versed in the art upon making reference to the following detailed description and accompanying drawings in which preferred embodiments incorporating the principles of the present invention are shown by way of illustrative example.

BRIEF DESCRIPTION OF THE DRAWINGS

FIG. 3 is a block diagram showing the detailed arrangement of the loop filter of the digital PLL apparatus in FIG. 2;

FIG. 4 a timing chart showing the operation timing of the digit PLL apparatus in FIG. 2.

DETAILED DESCRIPTION OF THE PREFERRED EMBODIMENT

Figure 1:
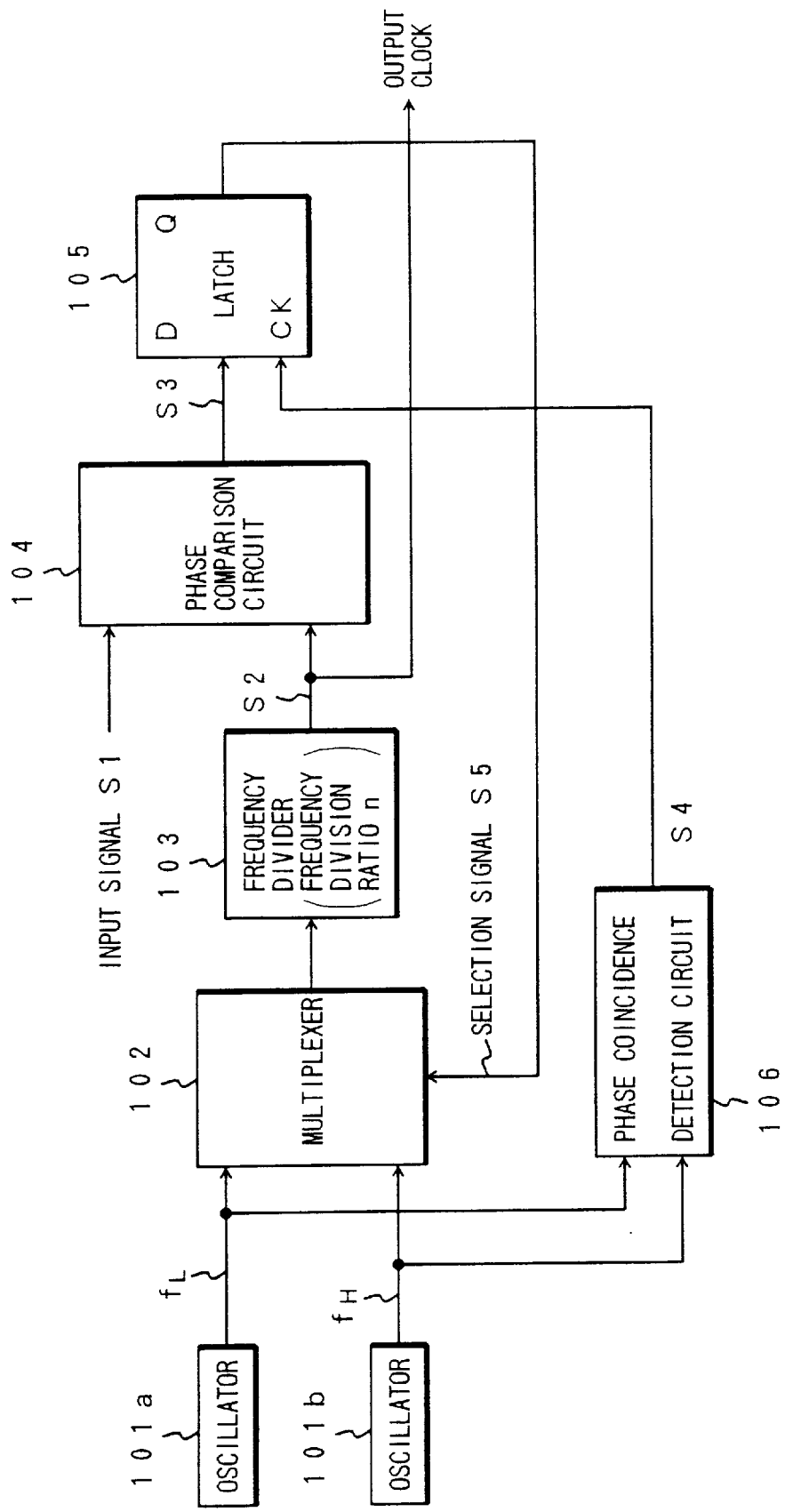
FIG. 1 is a block diagram showing a conventional digital PLL apparatus.
Figure 2:
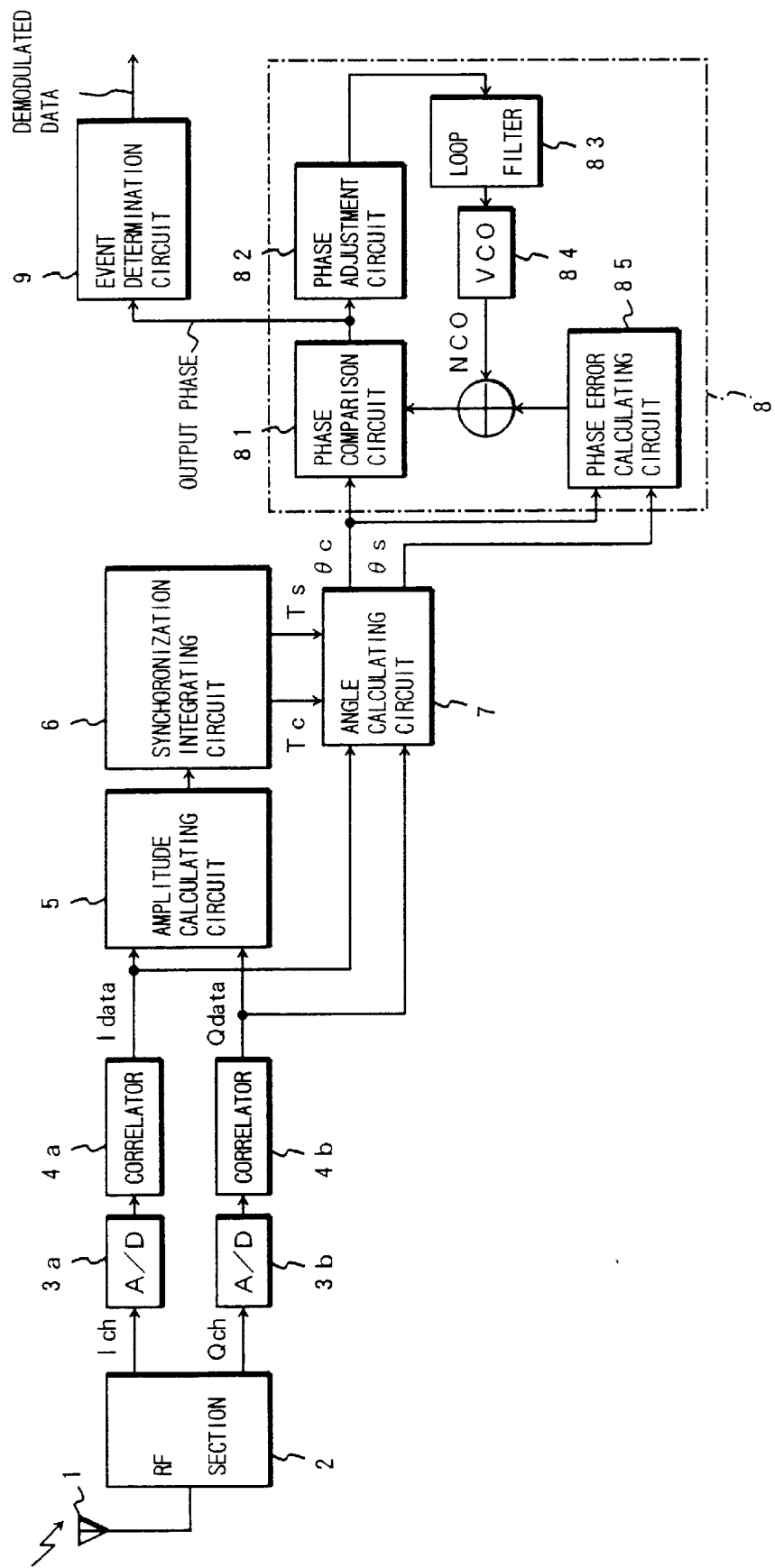
FIG. 2 is a block diagram showing a digital PLL apparatus according to an embodiment of the present invention.

FIG. 2 is a block diagram showing the arrangement of a receiver for spread-spectrum communication to which a digital PLL apparatus of the present invention is applied. Referring to FIG. 2, this digital PLL apparatus includes a synchronization integrating circuit 6 for determining a symbol timing by obtaining the amplitude maximum value point of the correlation level during reception of a preamble, an angle calculating circuit 7 for performing an angle calculation for every symbol timing determined by the synchronization integrating circuit 6 and outputting a phase $\theta c$, and a digital PLL circuit 8 for receiving the phase $\theta c$ from the angle calculating circuit 7 and operating the phase locked loop to obtain an output phase.

The synchronization integrating circuit 6 sequentially searches for amplitude maximum value points during the reception of data. If the synchronization integrating circuit 6 consecutively counts correlation maximum value points corresponding to K symbols within the range of ±½ chips with respect to a determined symbol timing Tc, the circuit 6 notifies the angle calculating circuit 7 of a symbol timing point Ts to which the symbol timing is to be moved. The angle calculating circuit 7 performs an angle calculation at the symbol timing Ts, and outputs the phase $\theta s$. The digital PLL circuit 8 integrates, L times, the difference between the phase $\theta c$ at the preceding maximum peak point and the phase $\theta s$ at the symbol timing point to which the symbol timing is moved in an L-symbol interval until the symbol timing moves, and multiplies the integral value by 1/L to average the value. The digital PLL circuit 8 then adds the resultant value to the NCO (Numerical Control Oscillator) of the digital PLL circuit 8 at the time when the synchronization integrating circuit 6 shifts the symbol timing.

More specifically, in this apparatus, a spread signal acquired by an antenna 1 is subjected to quadrature demodulation in an RF section 2. Ich and Qch data output from the RF section 2 are respectively converted into digital data by A/D converters 3a and 3b at an oversampling rate twice that for a spread chip. Digital data Idata and Qdata obtained by this A/D conversion are respectively de-spread by correlators 4a and 4b. The resultant output values are input to an amplitude calculating circuit 5. The amplitude calculating circuit 5 obtains an input amplitude value by performing a calculation of $\{(Idata)^2+(Qdata)^2\}^{1/2}$. Since the symbol timing is known on the reception side, and the A/D converters are designed to perform A/D conversion at the double oversampling rate, the synchronization integrating circuit 6 uses a shift register for performing a shift operation by (the number of spread chips of one symbol)×(2 clocks) to always add data immediately preceding one symbol to an amplitude level input. With this operation, the maximum correlation value within one symbol is detected from the value obtained by cyclic addition, and the detected point is set as a symbol timing Tc. This symbol timing Tc is extracted during reception of a preamble and always notified to the angle calculating circuit 7 at the timing that allows one symbol interval to be held. Subsequently, when a data reception state is set upon completion of the reception of the preamble, the synchronization integrating circuit 6 sequentially compares the input amplitude level at the symbol timing Tc with the input amplitude level at each ±½ chip. When the level at one of the ±½ chips exceeds the input level at the center point Tc owing to the influence of multipath or a precision error in the quartz oscillator, the synchronization integrating circuit 6 counts this event by using an up-down counter. If such events are consecutively counted in a K-symbol interval, e.g., a 128-symbol interval, the synchronization integrating circuit 6 notifies the angle calculating circuit 7 of a point Ts to which the center point of the symbol timing is to be moved. The synchronization integrating circuit 6 notifies the angle calculating circuit 7 of the symbol timing point at Ts as the center point Tc an L-symbol interval, e.g., a 16-symbol interval after the notification of Ts. The angle calculating circuit 7 has a function of calculating an angle $\theta$ every symbol timing, and calculates $\theta=\tan^{-1}\{(Qdata)/(Idata)\}$. Some method uses a ROM to obtain the angle $\theta$ from a ROM table. However, since it suffices if the angle $\theta$ is calculated within a 1-symbol interval, this angle can be obtained by using a shift register, an adder, and a comparator. Let $\theta c$ be the angle obtained at the timing Tc, and $\theta s$ be the angle obtained at the timing Ts.

The digital PLL circuit 8 will be described next. A phase comparison circuit 81 is a simple subtracter, which subtracts the value of the NCO of the digital PLL circuit 8 from the input angle $\theta c$ to obtain an output phase locked with the carrier. A phase adjustment circuit 82 serves to remove the modulation component on the transmission side. If the modulation scheme is BPSK, an MOD($\pi$) circuit may be used. If the modulation scheme is QPSK, an MOD($\pi/2$) circuit may be used. A loop filter 83 may have a circuit arrangement like the one shown in FIG. 3. Referring to FIG. 3, filter coefficient sections 111 and 112 are realized by bit shifts without using any multipliers and the like. Referring to FIG. 2, a VCO 84 is not constituted by an oscillator and a counter but is constituted by a register, an adder, and a loop integrator. A phase error calculating circuit 85 is a circuit for integrating the differences between $\theta c$ and $\theta s$ in an L (16)-symbol interval and dividing the resultant value by L (=16) to obtain the phase error average value between $\theta c$ and $\theta s$.

An event determination circuit 9 is a circuit for determining demodulation data depending on a specific event in I or Q in which the output phase from the digital PLL circuit 8 is present.

The operation of the digital PLL apparatus in FIG. 2 will be described next with reference to FIGS. 2 and 4. FIG. 4 shows the operation timing of each block. The waveform of an output from the amplitude calculating circuit 5 indicates that the maximum correlation amplitude level is present at the first center point Tc, but a correlation level higher than the amplitude level at the center point is present at ±½ chip with respect to the center point afterward owing to the influences of quartz oscillator errors, multipath, and the like. Letting Ts be the timing point corresponding to ±½ chip, the synchronization integrating circuit 6 keeps counting until the amplitude level at Ts consecutively exceeds the amplitude level at Tc in a K-symbol interval. Since the angle calculating circuit 7 receives only the timing of Tc during this period, the circuit 7 performs an angle calculation at Tc to obtain $\theta c$. The digital PLL circuit 8 operates the phase locked loop at $\theta c$ to obtain an output phase. When the synchronization integrating circuit 6 consecutively counts in a K-symbol interval, the circuit 6 notifies the angle calculating circuit 7 of the symbol timing Tc and the symbol timing Ts to which the center point is to be moved. Upon reception of Tc and Ts, the angle calculating circuit 7 obtains corresponding $\theta c$ and $\theta s$. The phase error calculating circuit 85 executes ($\theta c-\theta s$) in units of symbols, integrates the resultant values in an L-symbol interval, and divides the resultant value by L, thereby obtaining a phase error average value $\Sigma(\theta c-\theta s)/L$. After L symbols, the synchronization integrating circuit 6 moves the timing Ts to the timing Tc as the center point. That is, Ts becomes Tc. When the timings are switched, the obtained θc is input to the digital PLL circuit 8, and the value of Σ(θc−θs)/L is added to the NCO, thereby obtaining an output phase.

Figure 5A:
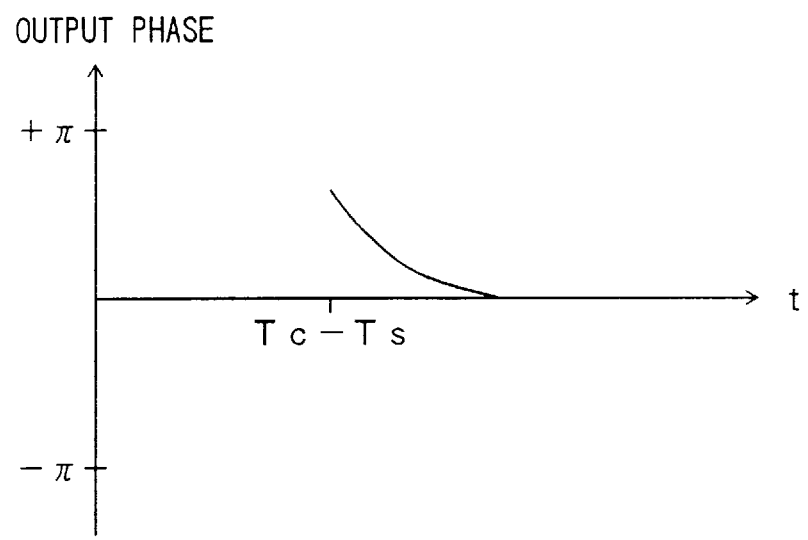
FIGS. 5 and 5B are charts showing the effects of the digital PLL apparatus in FIG. 2.
Figure 5B:
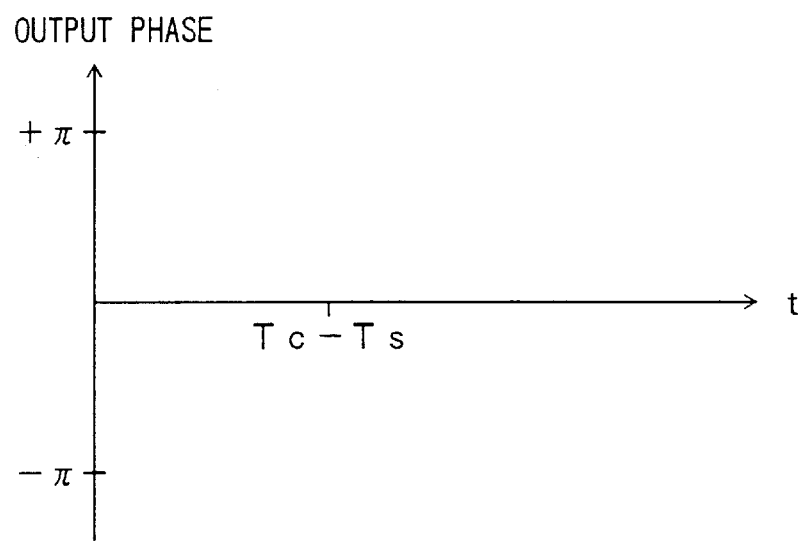

FIGS. 5A and 5B are charts showing the effects of the present invention. Referring to FIGS. 5A and 5B, the abscissa indicates the time; and the ordinate, the output phase from the digital PLL circuit 8. FIG. 5A shows a case wherein no phase error is added. FIG. 5B shows a case wherein the operation of the digital PLL apparatus of the present invention is executed. When the symbol timing is switched from Tc to Ts, since the phase information of θc is different from that of θs, a phase distortion is present in the output phase from the digital PLL circuit 8. The output phase follows up the input phase owing to the function of the phase locked loop with time. Finally, the output phase is locked. As is apparent, in the present invention shown in FIG. 5B, when the symbol timing is switched from Tc to Ts, since the difference between the phase information of θc and that of θs is added to the NCO of the digital PLL circuit 8, the output phase includes no phase distortion, and is instantaneously locked. Although the above description is associated with the symbol timing deviation in the direction of ±½ chip, but the same applies to the timing deviation in the direction of −½ chip.

What is claimed is:

1. A digital PLL apparatus comprising: synchronization integration circuit determining a symbol timing by obtaining a maximum amplitude point of a correlation level during reception of a preamble, an angle calculating circuit outputting a phase θc by performing an angle calculation for every symbol timing determined by said synchronization integrating circuit and outputting a phase θs by performing an angle calculation at a symbol timing point, and a digital PLL circuit receiving the phases θc and θs from said angle calculating circuit and operating a phase locked loop, and said digital PLL circuit integrates, L times, the phase θc at a symbol timing at a preceding maximum peak point and the phase θs at a symbol timing point to which the symbol timing is to be moved in an L-symbol interval until the symbol timing is moved, and adds an average value obtained by multiplying the integration result by 1/L to a numerical control oscillator in said digital PLL circuit when said synchronization integrating circuit shifts the symbol timing, thereby obtaining an output phase.

2. An apparatus according to claim 1, wherein said synchronization integrating circuit sequentially searches for a maximum amplitude value point, and, when correlation maximum value points corresponding to K symbols are consecutively counted at points each corresponding to one of 35 ½ chips with respect to a determined symbol timing Tc, and notifies said angle calculating circuit of a symbol timing points Ts to which the symbol timing is to be moved, said angle calculating circuit outputs a phase θs by performing an angle calculation at the symbol timing point Ts.

3. A digital PLL apparatus wherein a signal having undergone spread-spectrum modulation is received, de-spread demodulation of the signal is performed by performing correlation calculation using a spread code for each in-phase and quadrature component, a synchronization point Tc at which a maximum correction value can be obtained is obtained by the de-spread demodulation, a synchronization point at which a maximum correlation value is obtained is sequentially searched for, a synchronization point Ts to which the synchronization point is to be moved from the synchronization point Tc is set when correlation maximum points are consecutively counted in a K-symbol interval within a range of ±½ chips with respect to a correlation value at the synchronization point Tc, angle information θs is obtained at the synchronization point Ts, an arithmetic means of differences (θc−θs) between angle information obtained at the synchronization point Tc and the angle information θs is obtained in an L-symbol interval until switching from the synchronization point Ts to the synchronization point Tc is performed, thereby obtaining phase error information.

4. An apparatus according to claim 3, wherein when the synchronization point is switched from the synchronization point Tc to the synchronization point Ts, angle information obtained at the synchronization point Ts is input to a digital PLL circuit, and the obtained phase error information is added to a phase locked loop circuit of said digital PLL circuit.

* * * * *